Nov. 21, 1939.   R. W. E. VICKERY   2,180,445
ELECTRIC STEAM GENERATOR
Filed April 8, 1938   2 Sheets-Sheet 1

Inventor
Ralph W. E. Vickery
by Roberts, Cushman & Woodbury
Att'ys

Nov. 21, 1939. R. W. E. VICKERY 2,180,445
ELECTRIC STEAM GENERATOR
Filed April 8, 1938 2 Sheets-Sheet 2

Inventor
Ralph W. E. Vickery
by Roberts, Cushman & Woodbury
Attys.

Patented Nov. 21, 1939

2,180,445

UNITED STATES PATENT OFFICE 2,180,445

ELECTRIC STEAM GENERATOR

Ralph W. E. Vickery, Brockton, Mass.

Application April 8, 1938, Serial No. 200,875

18 Claims. (Cl. 219—40)

This invention relates to an electric steam or vapor generator, and its principal objects are to provide a steam or vapor generator which is quick-acting and self-regulating in accordance with the demand or required output, which is capable of adjustment to deliver vapor or steam at any desired pressure, and which is efficient and reliable in operation; and to provide a steam generator capable of maintaining a substantially uniform output which may be varied throughout a wide range without materially affecting its efficiency and without causing a surging in the electrical circuit such as is often encountered in systems of this type.

Further objects of the invention will be apparent from a consideration of the following description and the accompanying drawings, wherein.

Figure 1:
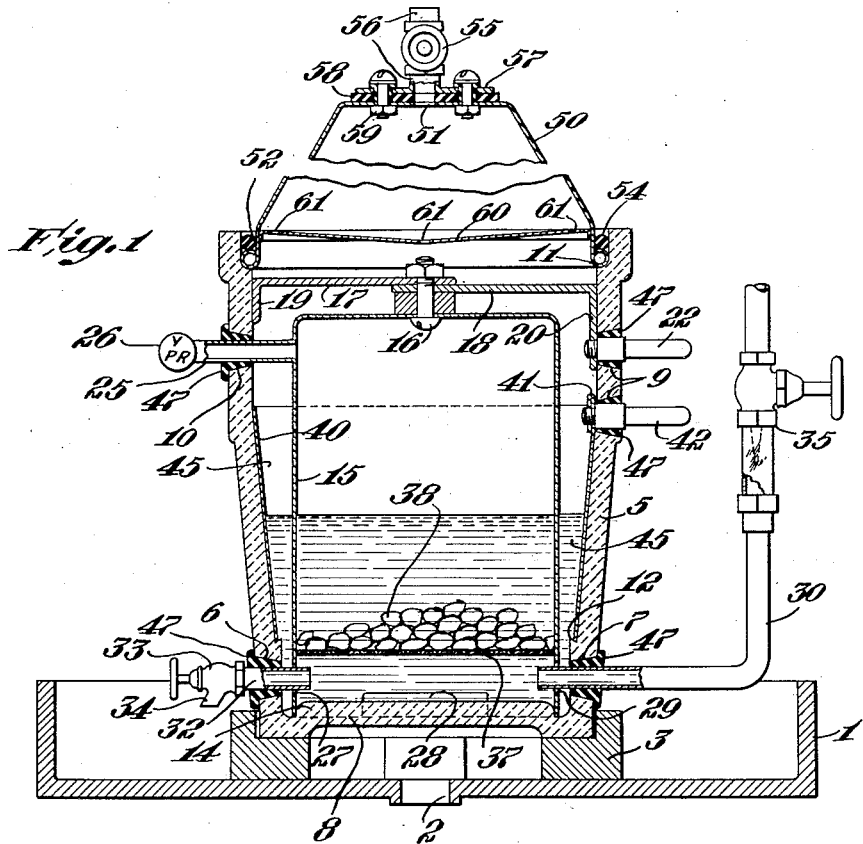
Fig. 1 is a vertical section through a steam generator constructed in accordance with the present invention.

In accordance with the present invention, my improved steam generator comprises an enclosed vapor or steam-generating vessel having a delivery outlet and within the vessel an inner chamber, preferably in the form of an inverted container, having means defining a communication between its interior and the lower part of the vessel. If desired, the lower end of the container may be spaced above the bottom of the steam-generating vessel, or one or more openings, ducts, or the like may be provided in the lower part of the container so as to provide a substantially unobstructed communication. The upper part of the container is connected with the duct providing a communication between its interior and the exterior of the steam-generating vessel, and, if desired, pressure-regulating means may be provided so that the pressure within the interior of both the container and the steam-generating vessel can not rise above a predetermined maximum.

Within the steam-generating vessel I provide electric heating means, such as two or more electrodes connected with a suitable source of alternating current. Where, as is preferred, the electric heating means comprises electrodes, at least one of the electrodes is disposed above the communication between the steam-generating vessel and the interior of the container, so that when the pressure of the steam generated is sufficient to force the water into the interior of the container, the circuit from one electrode to the other electrode (or electrodes, as the case may be) is broken, thereby automatically shutting off the electric current through the electrolyte and preventing the generation of more steam. As the pressure in the steam-generating vessel drops, water flows from the container and the circuit between the electrodes is thereupon reestablished and maintained until the pressure is again sufficient to force the water back into the container to break the circuit.

The movement of the water from the steam-generating vessel to the interior of this container and back to the steam-generating vessel is governed by the pressure conditions within the steam-generating vessel which varies in accordance with the output or demand. As the electric current passing through the electrodes is proportional to the depth or amount of water in the steam-generating vessel, it follows that the consumption of electric current likewise varies in accordance with the output. Hence, as the output varies from zero to full capacity, so also does the electric power input, and for any substantially constant output, the electric power input is likewise substantially constant. Since in any commercial installation the design of the apparatus is such as to accommodate "peak loads", the aforementioned characteristics are maintained and accordingly surging in the electrical circuit is effectively eliminated. In order to compensate for the steam delivered by the generator, there may be provided a water feed system which may include control means effective to deliver any desired amount of water.

The electrodes may be of any conventional design and disposed about the container so as to insure maximum efficiency. The particular type, the spacing and the number of electrodes may be varied in accordance with such factors as the voltage, the type of alternating current to be used (whether a single or polyphase system), the contemplated demand, the pressure of the steam to be delivered, etc., all of which depend upon the particular use to which the apparatus is to be put. Where the pressure of the steam to be delivered is low and the demand small, but steady, as for example when the apparatus is to be used to supply water vapor or steam at atmospheric pressure to a shoe mulling chamber, a single phase 110-volt alternating current may be satisfactorily used and a single pair of electrodes may be sufficient, in which case the container may constitute one of the electrodes and the other electrode may consist of a tubular member or the like disposed about the inner wall of the vessel with its lower end spaced above the communication leading to the interior of the container. On the other hand, where steam at a higher pressure is to be delivered and where the demand is greater or less constant, it is desirable to provide a plurality of inner chambers or containers, in which case each container preferably constitutes an electrode, the entire arrangement being such as to insure a quick generation of steam so as to meet irregular and heavy demands.

If it be desired to increase the conductivity through the water in the steam-generating vessel and at the same time avoid such concentrations of the electrolyte as would be injurious to the apparatus, or cause priming, I provide means for introducing into the water in the steam-generating vessel a salt sparingly soluble in water and relatively non-reactive with the electrodes or parts of the apparatus with which it may come in contact. To this end I preferably employ lumps of calcium sulphate, disposed on a screen or the like support and positioned either adjacent to the inlet of the water feed system, or the lower part of the container. In any case, the water within the steam-generating vessel, coming in contact with the calcium sulphate, dissolves an amount sufficient to increase its conductivity and thus insures an adequate flow of current under normal operating conditions.

Figure 2:
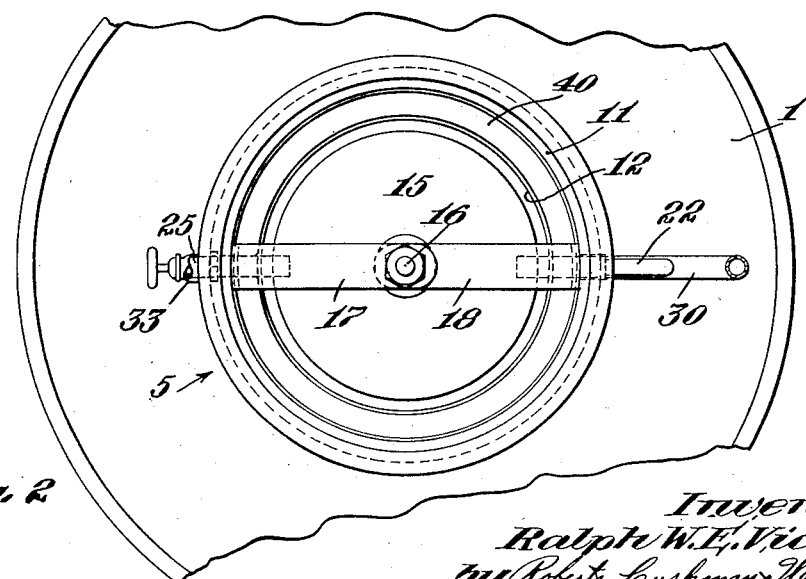
Fig. 2 is a plan view of the steam generator shown in Fig. 1 with its head removed.

Referring to Figs. 1 and 2, the embodiment shown therein comprises a trough-like member 1 having a drain opening 2 surrounded by an annular base member 3 which supports a steam-generating vessel 5, herein shown as consisting of a ceramic pot formed with oppositely disposed openings 6 and 7 adjacent to its bottom wall 8, a pair of openings 9 adjacent to its upper end, and an opening 10 diagonally opposite the openings 9. The upper end of the vessel 5 is formed with an interior annular shoulder 11, and adjacent to its lower end its side wall is formed with an interior annular shoulder 12. The upper surface of the bottom wall 8 is formed with an annular shoulder 14 about the periphery of which fits the lower end of an inner chamber, herein shown as an inverted container 15.

The container 15 is preferably of metal, and in this particular embodiment constitutes one of a pair of electrodes. The upper end of the container is provided with an opening through which a bolt 16 or like metallic fastening element extends, the bolt passing through openings at the inner ends of a pair of metallic brackets 17 and 18. The outer ends of these brackets are formed with feet 19 and 20 which are cemented or otherwise suitably secured to opposite parts of the wall of the vessel 5, the foot 20 having an opening registering with the upper opening 9 in the wall of the vessel. These brackets not only serve to anchor the upper end of the container 15 in position, but furthermore provide a conductor for electrically connecting the container or electrode 15 with a contact pin 22 which projects through the upper opening 9.

Adjacent to its upper end the container is provided with a duct 25 which extends outwardly through the opening 10, thus providing a communication between the interior of the container 15 and the exterior of the vessel 5. If desired, a pressure relief valve 26 may be provided to control the pressure within the container, that is, to prevent the pressure from rising above a desired or predetermined maximum.

The lower end of the container is formed with a plurality of circumferentially disposed openings 27, 28 and 29 which provide a free communication between the lower end of the container and the vessel. A water supply line 30 extends through the opening 7 and preferably projects through the opening 29 so that its end terminates within the body of the container 15, and a drain pipe 32 is similarly positioned, extending from within the container 15 outwardly through the opening 27 and through the opening 6 to the exterior of the vessel 5. The drain pipe is provided with a valve 33 and a snout 34 positioned to discharge drainage into the trough 1. The supply line 30 is provided with a valve-controlled drip-gauge 35 by means of which the flow through the supply 30 may be varied as desired, although it is to be understood that any other means for controlling the flow of feed water into the apparatus may be used. Within the container 15 and at a level somewhat above that of the supply line and drain pipe there is provided a supporting member such as a screen 37 for holding the lumps of calcium sulfate or like sparingly soluble salt 38.

A tubular electrode 40, preferably conforming to the contour of the inner wall of the vessel 5, is supported by the annular shoulder 12 which, as previously indicated, is at a level above that of the openings 28. This electrode is formed at its upper edge with an integral extension 41 which provides an electrical connection with a second contact pin 42 which projects through the lower opening 9. With this construction and arrangement the electrode 40 and the adjacent wall of the container 15 define an annular chamber 45 of wedge shape cross section, which constitutes the steam-generating zone. The prongs 22 and 42 are firmly secured within the openings 9 by insulating collars 47, and the ducts or lines 25, 30 and 32 are likewise secured within their respective openings.

The steam-generating vessel 5 is provided with a dome-like head or closure 50 having at its upper end an opening 51, and its lower edge is shaped to provide a flange 52 which squarely seats on the shoulder 11. An annular gasket 54 has a press fit within the recess defined by the lower end of the head 50 and the upper inner wall of the vessel 5 and, if desired, the gasket 54 may be cemented or otherwise suitably secured in position. A control valve 55 is connected in a delivery line 56 which communicates with the opening 51 in any suitable manner, here shown by way of illustration as comprising a flange 57 integral with the line 56, the flange seating upon a gasket 58 and being secured in position by means of bolts or like fastening elements 59.

Within the lower part of the head 50 there is provided a plate 60 formed with one or more restricted openings or orifices 61, the number and size of such openings depending upon the particular use to which the apparatus is to be put. For example, where the apparatus is to be used to supply a limited amount of steam or water vapor, the plate 60 would be provided with a limited number of restricted orifices 61 so that for a given pressure within the vessel 5 only a limited amount of vapor or steam would be permitted to pass from the vessel 5; but where the apparatus is to be used to meet varying demands, such restricted orifices would be dispensed with and a perforated plate would be used so as to provide a baffle effective to prevent priming of the steam delivered through the outlet 50. If desired, the entire apparatus may be enveloped in a suitable jacket of heat insulating material to prevent undue loss of heat.

To operate the apparatus the valve of the drip-gauge 35 is first opened and the drain valve 33 closed, thus permitting water to enter the vessel 5. When the water in the vessel and container has reached a level of approximately that of the lower part of the drip-gauge, the valves 35 and 55 may be closed. If steam at a relatively low pressure is to be delivered, the pressure regulating valve 26 may be set accordingly and the electric current may then be turned on. Since the water introduced into the vessel comes in contact with the lumps of calcium sulfate disposed on the screen 37, a slight amount is dissolved and hence the conductivity of the water is greatly increased. With a 110-volt alternating current and a normal water level in the vessel 5, the initial current consumption may be of the order of from 10 to 15 amperes (depending primarily upon the spacing of the electrodes and the height of the water in the steam-generating zone 45), and with an apparatus embodying the design herein illustrated, it usually requires but a few moments before the apparatus is thoroughly heated and sufficient steam is generated to force the water in the steam-generating zone into the container. As soon as the water level in the steam-generating zone drops below the electrode 40, the electrical circuit is broken and hence further generation of steam is arrested.

Should there be a slight drop in pressure within the vessel 5, the water level rises sufficiently to contact the lower end of the electrode 40, whereupon the circuit is reestablished and sufficient steam is then generated to compensate for the drop in pressure. When the delivery valve 55 is opened there is a momentary drop in pressure within the vessel 5, and such drop in pressure is not only effective to cause a spontaneous generation of steam from the water remaining in the lower part of the vessel, but also to permit water in the container to pass back into the steam-generating zone, whereupon the circuit is reestablished and steam is again generated to replace that delivered.

Since a drop in pressure causes an intermediate reentry of the heated water into the steam-generating zone, the generation of steam is substantially instantaneous, and as the drop in pressure is dependent upon the output and governs the amount of water admitted to the steam-generating zone, the amount of water in the steam-generating zone is likewise proportional to the output. Furthermore, as the amount of water admitted to or remaining in the steam-generating zone governs the electrical input or current consumption, the latter is also proportional to the output of steam, and for any substantially constant output, the water in the steam-generating zone is substantially constant, as is also the current consumption. Hence, under normal operating conditions the pressure in the vessel 5 remains substantially constant, except for momentary periods following the sudden change in output, and the water level in the steam-generating zone (and likewise the current consumption) varies in accordance with the output. If for any reason the steam pressure should rise above the predetermined maximum, the water forced back into the container will effect a corresponding increase in pressure within the container 15 and the valve 26 then comes into action to release the excess pressure.

During the operation of the apparatus water may be periodically supplied by opening the valve of the drip-gauge 35, but where the steam output can be estimated with a fair degree of accuracy, the valve of the drip-gauge may be set to supply sufficient water to compensate for steam generated and delivered. When desired, the water may be drained from the apparatus by opening the drain valve 33, and with the drain valve open and the supply line 30 also open, the apparatus may be flushed to remove sediment or other accumulations.

Figure 3:
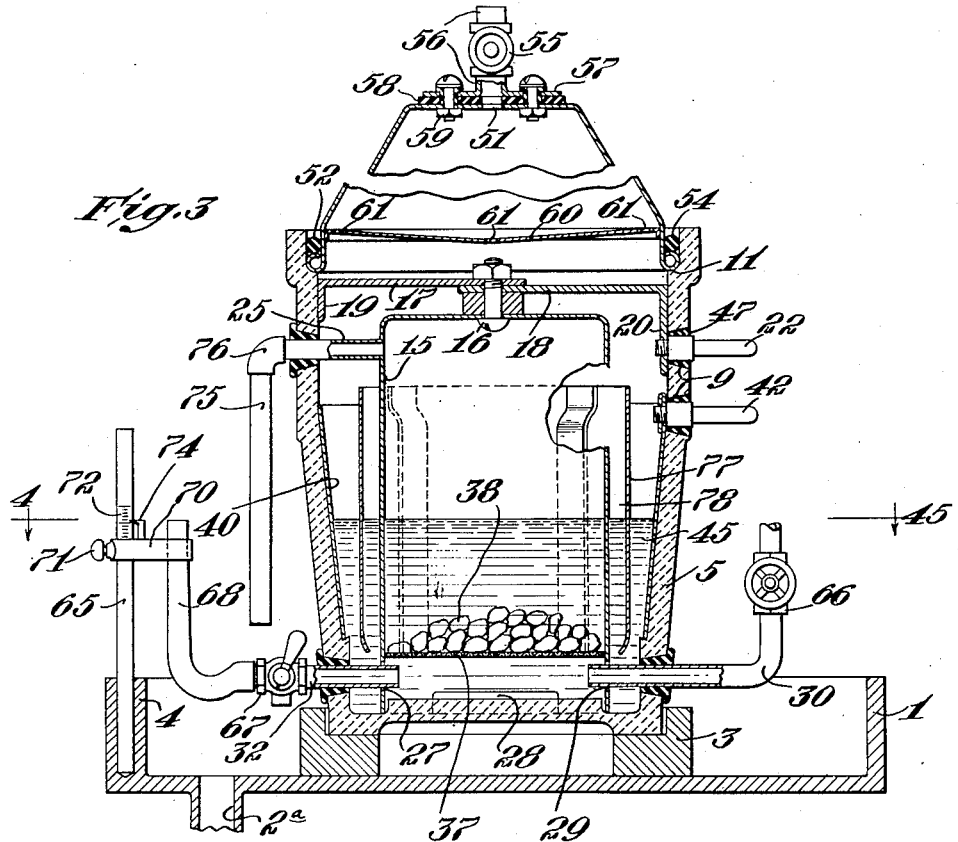
Fig. 3 is a vertical section of a modified embodiment of the invention.
Figure 4:
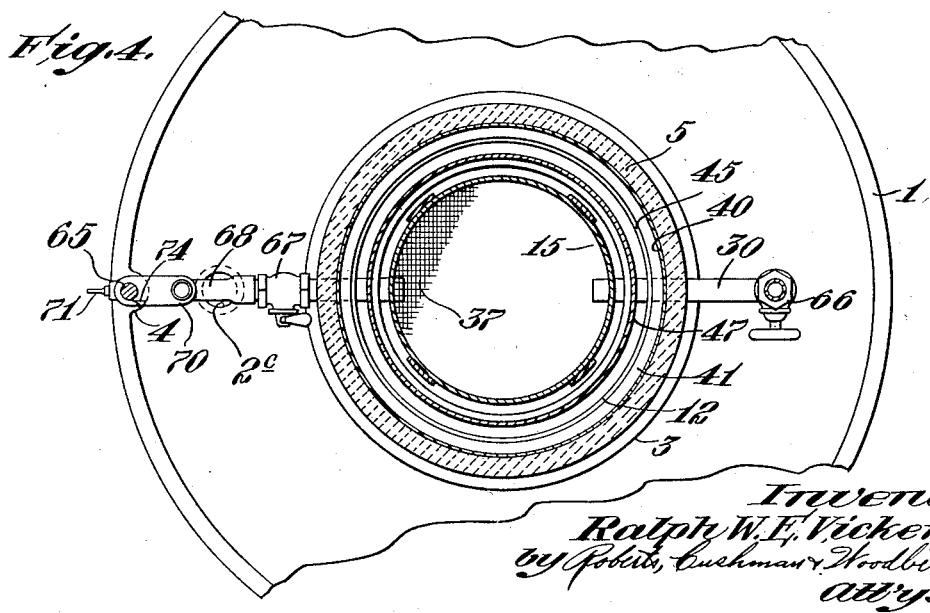
Fig. 4 is a horizontal section substantially on the line 4—4 of Fig. 3.

The embodiment shown in Figs. 3 and 4 is, in all material particulars, substantially identical to that shown in Figs. 1 and 2 and the same reference characters are applied to corresponding parts. However, the apparatus of this embodiment is designed to operate at atmospheric pressure and accordingly the apparatus embodies certain changes in addition to other details presently to be described.

The trough 1 is formed with an enlarged wall portion 4 provided with a vertically extending opening in which the lower end of an upright post 65 is firmly secured and the drain opening 2ª is formed adjacent to the wall portion 4. In place of the drip-gauge 35 and drain valve 33 shown in the previously described embodiment, the water supply supply line 30 is provided with a simple shut-off valve 66, and a drain pipe 32 is connected with a two-way valve 67, which, in turn, is connected with a piece of flexible tubing 68.

The free end of the tubing 68 is carried by one end of an arm 70, the other end of which embraces the upright post 65 and carries a set screw 71 by means of which the arm may be secured at any desired level. The upper part of post 65 carries a scale indicated at 72 which may be graduated in inches, centimeters, or the like to indicate the water level within the vessel 5, and the arm 70 carries a pointer 74 disposed at the same level as the free end of the tubing 68 and adapted to cooperate with the scale 72. With this construction and arrangement the arm may be set at any given level and water may then be admitted to the vessel through the line 30 until the level therein is the same as that of the top of the tubing 68, it being noted that the tubing 68 not only provides a level gauge, but also serves as an overflow. By raising or lowering the arm 68, a greater or lesser amount of water may be supplied to the vessel. It is to be understood that after having supplied the vessel with the desired amount of water, the valves 66 and 67 may be set as in the above-described embodiment.

The duct 25 is connected with a depending pipe 75 by means of an elbow 76, the pipe 75 being positioned so that any condensation therefrom is discharged into the trough, preferably at a point adjacent to the drain opening 2ª.

Although the container 15 may provide one of a pair of electrodes, as in the previously described embodiment, it may also be used as a support for a removable electrode, here shown as consisting of a tubular member or skirt 77 integral with a plurality of circumferentially spaced fingers 78 which yieldingly engage the outer face of the container 15 to support the skirt 77 in spaced relation thereto. The removable electrode not only reduces the effective size of the steam-generating zone 45, but also relieves the wall of the container 15 from the electrolytic action to which it might otherwise be subjected.

This arrangement has the further advantage of permitting the use of a lower voltage without materially changing the capacity of the apparatus. For example, without a removable electrode a 220-volt circuit could be used to generate a given amount of steam, but with the removable electrode positioned as herein shown, a 110-volt circuit could be used to produce substantially the same results. The operation of the apparatus of this embodiment is substantially identical with that previously described, it being understood that vessel 5 may be drained and/or flushed simply by opening the valves 66 and 67.

An apparatus constructed in accordance with either of the above embodiments may be used for a variety of domestic, laboratory and commercial purposes, as, for example, to supply steam for cooking, a steam bath, a sterilizer, a shoe muller or conditioning chamber, etc.,—it being understood that the apparatus may be built in any of a wide range of sizes, depending upon the nature of the contemplated use.

While I have shown and described different embodiments of this invention, it is to be understood that the present disclosure is for the purpose of illustration and that various changes in shape, proportion, and arrangement of parts, as well as the substitution of equivalent elements for those herein shown and described, may be made without departing from the spirit and scope of the invention as set forth in the appended claims.

I claim:

1. An electric steam generator comprising a steam-generating vessel, an inverted container disposed within said vessel and defining a steam-generating zone between the exterior of the container and the interior wall of said vessel, said container having means defining a communication between its interior and the lower part of said vessel, means providing a communication between the upper end of said container and the exterior of said vessel, and a source of electric energy operatively associated with said steam-generating zone and effective to heat water therein.

2. An electric steam generator comprising a steam-generating vessel, an inverted container disposed within said vessel and defining a steam-generating zone between the exterior of the container and the interior wall of said vessel, a communication between the lower end of said container and the interior of said vessel, means providing a communication between the interior of said container and the exterior of said vessel, and a source of electric energy operatively associated with said steam-generating zone and effective to heat water therein.

3. An electric steam generator comprising a steam-generating vessel, an inverted container disposed within said vessel and defining a steam-generating zone between the exterior of the container and the interior wall of said vessel, said container having means defining a communication between its interior and the lower part of said vessel, means providing a communication between the upper end of said container and the exterior of said vessel, means for feeding regulable amounts of water into said vessel, and a source of electric energy operatively associated with said steam-generating zone and effective to heat water therein.

4. An electric steam generator comprising an enclosed steam-generating vessel, an inverted container disposed within said vessel and defining a steam-generating zone between the exterior of the container and the interior wall of said vessel, said container having means defining a communication between its interior and the lower part of said vessel, a duct providing a communication between the upper end of said container and the exterior of said vessel, and electrodes, at least one of which is disposed in said steam-generating zone and spaced above said means defining a communication between the container and vessel.

5. An electric steam generator comprising an enclosed steam-generating vessel, an inverted container disposed within said vessel and defining a steam-generating zone between the exterior of the container and the interior wall of said vessel, a communication between the lower end of said container and the interior of said vessel, a duct providing a communication between the interior of said container and the exterior of said vessel, and electrodes, at least one of which is disposed in said steam-generating zone and spaced above said communication between the vessel and container.

6. An electric steam generator comprising an enclosed steam-generating vessel, an inverted container disposed within said vessel and defining a steam-generating zone between the exterior of the container and the interior wall of said vessel, said container having its lower end spaced above the bottom of said vessel thereby to provide a communication between its interior and the interior of said vessel, a duct providing a communication between the upper part of said container and the exterior of said vessel, and electrodes, at least one of which is disposed in said steam-generating zone and spaced above the lower end of said container.

7. An electric steam generator comprising an enclosed steam-generating vessel, an inverted container disposed within said vessel and defining a steam-generating zone between the exterior of the container and the interior wall of said vessel, said container having means defining a communication between its interior and the lower part of said vessel, means providing a communication between the upper end of said container and the exterior of said vessel, means for feeding regulable amounts of water into said vessel, and electrodes at least one of which is disposed in said steam-generating zone and above said means defining a communication between the vessel and the container.

8. An electric steam generator comprising an enclosed steam-generating vessel, an inverted container disposed within said vessel and defining a steam-generating zone between the exterior of the container and the interior wall of said vessel, said container having means defining a communication between its interior and the lower part of said vessel, means providing a communication between the upper end of said container and the exterior of said vessel, means for controlling the pressure within said container, and a source of electric energy operatively associated with said steam-generating zone and effective to heat water therein.

9. An electric steam generator comprising an enclosed steam-generating vessel, an inverted container disposed within said vessel and defining a steam-generating zone between the exterior of the container and the interior wall of said vessel, said container having means defining a communication between its interior and the lower part of said vessel, means providing a communication between the upper end of said container and the exterior of said vessel, means effective to maintain a predetermined pressure within said container, and electrodes at least one of which is disposed in said steam-generating zone and above said communication between the vessel and container.

10. An electric steam generator comprising an enclosed steam-generating vessel, an inverted container disposed within said vessel and defining a steam-generating zone between the exterior of the container and the interior wall of said vessel, said container having means defining a communication between its interior and the lower part of said vessel, means providing a communication between the upper end of said container and the exterior of said vessel, means for controlling the normal water level within said vessel, and a source of electric energy operatively associated with said steam-generating zone and effective to heat water therein.

11. An electric steam generator comprising an enclosed steam-generating vessel, an inverted container disposed within said vessel and defining a steam-generating zone between the exterior of the container and the interior wall of said vessel, said container having means defining a communication between its interior and the lower part of said vessel, means providing a communication between the upper end of said container and the exterior of said vessel, means for controlling the normal water level within said vessel, and electrodes at least one of which is disposed in said steam-generating zone and above said communication between the vessel and the container.

12. An electric steam generator comprising an enclosed steam-generating vessel, an inverted container disposed within said vessel and defining a steam-generating zone between the exterior of the container and the interior wall of said vessel, said container having means defining a communication between its interior and the lower part of said vessel, means providing a communication between the upper end of said container and the exterior of said vessel, and electrodes at least one of which is associated with said container and another of which is disposed in said steam-generating zone.

13. An electric steam generator comprising an enclosed steam-generating vessel, an inverted container disposed within said vessel and defining a steam-generating zone between the exterior of the container and the interior wall of said vessel, said container having a part constituting an electrode, a communication between the lower end of said container and the interior of said vessel, means providing a communication between the interior of said container and the exterior of said vessel, and at least one other electrode disposed in said steam-generating zone and spaced above said communication between the vessel and container.

14. An electric steam generator comprising an enclosed steam-generating vessel, an inverted container disposed within said vessel, said container having means defining a communication between its interior and the lower part of said vessel, means providing a communication between the upper end of said container and the exterior of said vessel, means at the lower end of said container for supporting a mass of material effective to increase the electrical conductivity of water within said vessel, and electrodes, at least one of which is disposed above the communication between the container and vessel.

15. An electric steam generator comprising a steam-generating vessel of electrically non-conducting material, an inverted container disposed within said vessel with its lower end spaced above the bottom of said vessel thereby to provide a communication between its interior and the interior of said vessel, means providing a communication between the upper part of said container and the exterior of said vessel, and at least two electrodes, one of which is juxtaposed to the inner wall of said vessel, the lower end of one of said electrodes being spaced above the lower end of said container.

16. An electric steam generator comprising a steam-generating vessel of electrically non-conducting material, an inverted metal container disposed within said vessel with its lower end spaced above the bottom of said vessel thereby to provide a communication between its interior and the interior of said vessel, said container constituting an electrode, means providing a communication between the upper part of said container and the exterior of said vessel, a circumferentially extending electrode juxtaposed to the inner wall of said vessel in spaced relation to said container and with its lower end spaced above the lower end of said container.

17. An electric steam generator comprising a steam-generating vessel, an inverted container having its lower portion disposed within said vessel, the wall of said vessel and lower portion of said container being shaped to define a steam-generating zone of upwardly divergent cross-section, a communication between the lower end of said container and the interior of said vessel, a communication between the interior of said container and the exterior of said vessel, and a source of electric energy operatively associated with said steam-generating zone.

18. An electric steam generator comprising a steam-generating vessel, an inverted container having its lower portion disposed within said vessel, the wall of said vessel and lower portion of said container being shaped to define a steam-generating zone of upwardly divergent cross-section, a communication between the lower end of said container and the interior of said vessel, a communication between the interior of said container and the exterior of said vessel, and electrodes at least one of which is disposed in said steam-generating zone and spaced above said communication between said vessel and container.

RALPH W. E. VICKERY.